US010713388B2

(12) United States Patent
Ray et al.

(10) Patent No.: US 10,713,388 B2
(45) Date of Patent: Jul. 14, 2020

(54) STACKED ENCRYPTION

(71) Applicant: Polyport, Inc., Atlanta, GA (US)

(72) Inventors: Partha Ray, Atlanta, GA (US); Michael James Shull, Atlanta, GA (US)

(73) Assignee: Polyport, Inc., Atlanta, GA (US)

( * ) Notice: Subject to any disclaimer, the term of this patent is extended or adjusted under 35 U.S.C. 154(b) by 168 days.

(21) Appl. No.: 15/979,829

(22) Filed: May 15, 2018

(65) Prior Publication Data

US 2018/0330120 A1 Nov. 15, 2018

Related U.S. Application Data

(60) Provisional application No. 62/508,520, filed on May 19, 2017, provisional application No. 62/506,347, filed on May 15, 2017.

(51) Int. Cl.
*G06F 21/62* (2013.01)
*G06F 16/13* (2019.01)
*G06F 30/00* (2020.01)

(52) U.S. Cl.
CPC .......... *G06F 21/6281* (2013.01); *G06F 16/13* (2019.01); *G06F 21/6209* (2013.01); *G06F 30/00* (2020.01)

(58) Field of Classification Search
CPC ...... G06F 21/6281; G06F 16/13; G06F 17/50; G06F 21/6209
See application file for complete search history.

(56) References Cited

U.S. PATENT DOCUMENTS

| 6,523,116 | B1 | 2/2003 | Berman |
| 7,589,868 | B2 | 9/2009 | Velde et al. |
| 8,286,236 | B2 | 10/2012 | Jung et al. |
| 9,087,199 | B2 | 7/2015 | Sallam |
| 9,274,823 | B1 | 3/2016 | Koryakin et al. |
| 9,298,939 | B2 * | 3/2016 | Margolin ............... G06F 21/606 |
| 9,344,516 | B2 * | 5/2016 | Lee ...................... H04L 67/2852 |
| 2002/0196935 | A1 | 12/2002 | Wenocur et al. |
| 2003/0165242 | A1 | 9/2003 | Walker |

(Continued)

FOREIGN PATENT DOCUMENTS

| WO | 02/10962 A1 | 2/2002 |
| WO | WO2014037806 A2 | 3/2014 |

(Continued)

OTHER PUBLICATIONS

International Application No. PCT/US2018/032659, International Search Report & Written Opinion, 13 pages, dated Aug. 31, 2018.

*Primary Examiner* — Matthew Smithers

(57) ABSTRACT

Various embodiments of the present technology generally relate to file sharing, encryption, and protection of digital assets. More specifically, some embodiments of the present technology relate to computer files comprising an unencrypted file combined with an encrypted file, and methods for creation of such combined files. The unencrypted file can be read by target applications and can present a variety of information (e.g., contact information, registration information, etc.). The encrypted data may be accessed only when the proper management software, drivers, application programming interfaces, and other components of a runtime environment have been installed on a computing device.

36 Claims, 9 Drawing Sheets

(56) References Cited

U.S. PATENT DOCUMENTS

| | | |
|---|---|---|
| 2004/0190715 A1 | 9/2004 | Nimura et al. |
| 2004/0205653 A1* | 10/2004 | Hadfield ............... G06Q 10/10 715/255 |
| 2005/0138371 A1 | 6/2005 | Supramaniam et al. |
| 2007/0061565 A1 | 3/2007 | Valenci et al. |
| 2008/0016339 A1 | 1/2008 | Shukla |
| 2011/0213700 A1 | 9/2011 | Sant'Anselmo |
| 2012/0079594 A1 | 3/2012 | Jeong et al. |
| 2013/0097421 A1* | 4/2013 | Lim ..................... G06F 21/602 713/167 |
| 2013/0332723 A1* | 12/2013 | Tan ..................... G06F 16/176 713/150 |
| 2014/0067609 A1 | 3/2014 | Heger |
| 2014/0223583 A1 | 8/2014 | Wegner et al. |
| 2014/0331062 A1* | 11/2014 | Tewari ............... G06F 21/6227 713/189 |
| 2015/0312233 A1* | 10/2015 | Graham, III ............ H04L 9/006 713/171 |
| 2015/0332058 A1* | 11/2015 | Chen ..................... G06T 17/20 713/193 |
| 2016/0063035 A1 | 3/2016 | Rejal et al. |
| 2017/0063809 A1 | 3/2017 | Aissi et al. |
| 2017/0302696 A1 | 10/2017 | Schutz et al. |
| 2018/0375644 A1* | 12/2018 | Karagiannis ............ H04L 9/083 |

FOREIGN PATENT DOCUMENTS

| | | |
|---|---|---|
| WO | WO2017073830 A1 | 5/2017 |
| WO | WO2017156568 A1 | 9/2017 |

* cited by examiner

FIG. 7B

STACKED ENCRYPTION

CROSS-REFERENCE TO RELATED APPLICATIONS

This application claims priority to U.S. Provisional Application Ser. No. 62/506,347 entitled "STACKED ENCRYPTION" and filed on May 15, 2017 and to U.S. Provisional Application Ser. No. 62/508,520 entitled "STACKED ENCRYPTION" and filed on May 19, 2017, both of which are incorporated herein by reference in their entirety for all purposes.

TECHNICAL FIELD

Various embodiments of the present technology generally relate to file sharing, encryption, and protection of digital assets. More specifically, some embodiments of the present technology relate stacked encryption.

BACKGROUND

Modern electronic devices such as computers, tablets, mobile phones, wearable devices and the like have become a common part of modern life. Many users of electronic devices routinely utilize various types of software applications for business and personal activities. Examples of software applications can include word processors, spreadsheet applications, e-mail clients, notetaking software, presentation applications, games, computational software, computer aided design (CAD) tool, and others. These software applications can also be used to perform calculations, produce charts, organize data, receive and send e-mails, communicate in real-time with others, and the like. The software applications can range from simple software to very complex software.

With this proliferation of electronic devices, the ease at which information can be exchanged has greatly increased. In fact, the exchange of information using these electronic devices makes protecting proprietary information difficult. For example, hackers attempt to gain access to sensitive data, rogue employees can transmit files to others, and the like. Cryptography and firewalls have been used to protect files, data, and various communications. Using encryption, for example, one party can protect the content of the files which can be transmitted to another party in a manner to prevent some unwanted access or theft of the proprietary information.

However, once the recipient receives and decrypts the file or data, the recipient is often free to copy and redistribute the file. As such, there are a number of challenges and inefficiencies created in traditional security frameworks and solutions. It is with respect to these and other problems that embodiments of the present technology have been made.

SUMMARY

Various embodiments of the present technology generally relate to file sharing, encryption, and protection of digital assets. More specifically, some embodiments of the present technology relate to computer files comprising an unencrypted file combined with an encrypted file, and methods for creation of such combined files. The unencrypted file can be read by target applications and can present a variety of information (e.g., contact information, registration information, etc.). The encrypted data may be accessed only when the proper management software, drivers, application programming interfaces, and other components of a runtime environment have been installed on a computing device.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which:

FIGS. 7A-7B illustrate examples of a project dashboard that can be used in accordance with some embodiments of the present technology.

Figure 1:
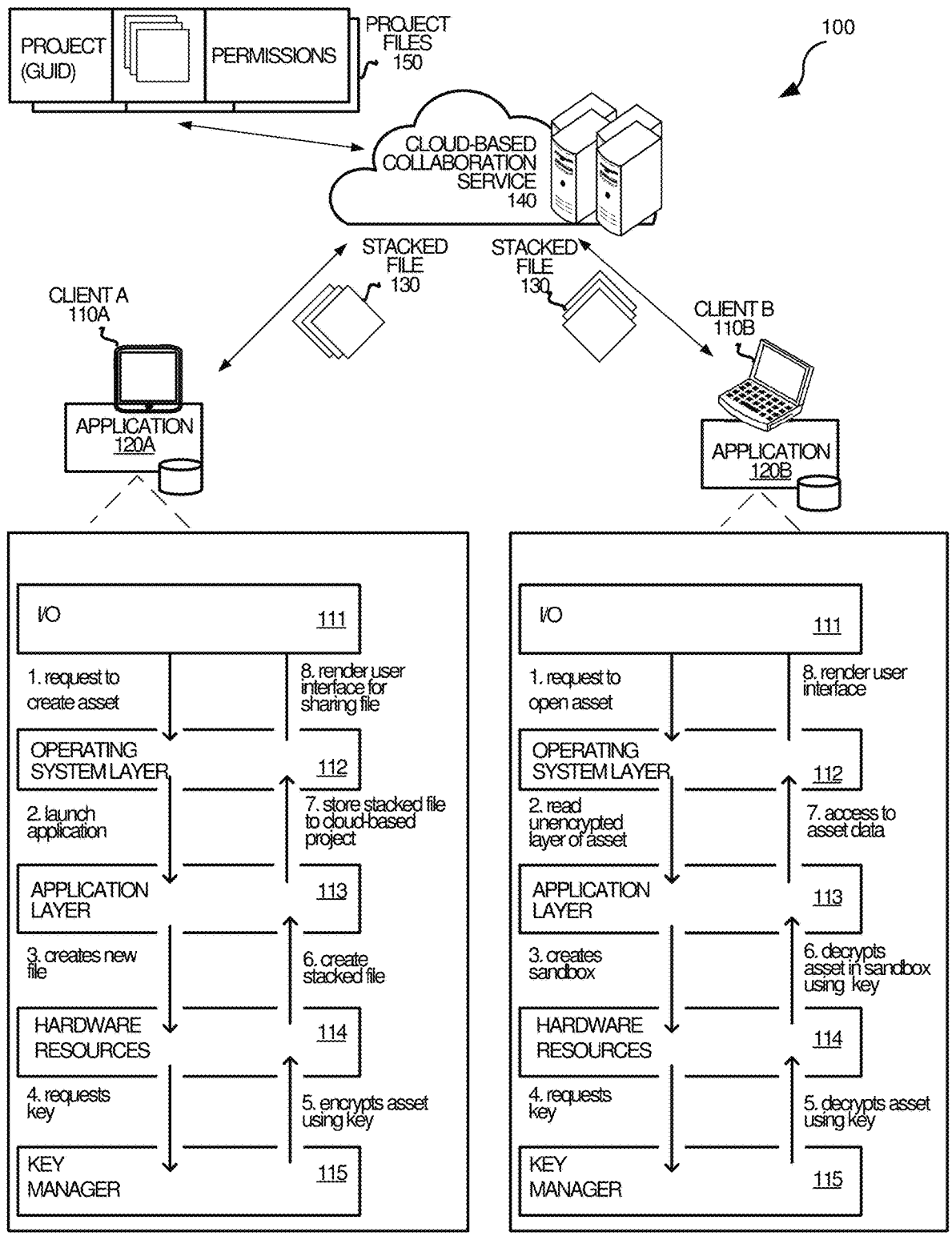
FIG. 1 illustrates an example of a cloud-based collaboration service in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to file sharing, encryption, and protection of digital assets. More specifically, some embodiments of the present technology relate stacked encryption. Traditionally encrypted digital assets (e.g., computer files, recordings, etc.) can be secured with a password. The password and digital asset can be communicated to a receiving party through separate communications and even through different communication channels (e.g., e-mail, text, verbal exchange, etc.). The receiving party will then need to enter the password to gain access to the document. However, there is little control over what the receiving party does with the file and password in their possession. Moreover, there is no way for another party to know the origins and owner of the original digital asset.

In contrast, some embodiments provide for systems and methods that allow for collaboration between parties while controlling the distribution and access to shared digital assets (e.g., 3D files). In some embodiments, a stacked file can be created by encrypting a file and stacking another unencrypted file on top of the encrypted file to create a single combined file. The unencrypted file can be read by target applications and can present a variety of information. For example, the unencrypted data may present a virtual business card providing contact information (e.g., company name, contact name, mailing address, e-mail address, telephone number, fax number, etc.) for the owner of the file. The encrypted data may be accessed when the proper management software, drivers, application programming interfaces, and other components have been installed on a computing device.

The stacking of the files, in one or more embodiments, may involve usage of commenting mechanisms within the formatting of the combined file so that certain information or material in the files are not read when the stacked file is run. As a result, some embodiments of the stacked file structure allow the file to be opened in a normal manner without un-encryption while keeping the encrypted contents at the end of the file which are formatted in such a way that any software which reads the file will skip the encrypted portion and only read the un-encrypted part.

Such commenting often uses markers separating the comment section of the file from the operating section of the file. For example, the markers may be specific to the file type but are generally a comment character indicating to the software reading the file not to compile the contents which occurs after the marker. In various embodiments of the stacked encryption the commenting markers may be used to separate the unencrypted portion of the combined file from the encrypted portion of the file. These markers may be inserted at the end of the unencrypted file to indicate that the file ends there, but the encrypted contents can be stored below these markers. This allows the file to operate in a normal manner while the actual contents are still encrypted.

In some embodiments, a user can run any application they want on their computer or collaborator machine. The application can run in a protected sandbox on the machine. A sentinel or watcher can monitor what is happening in the protected sandbox and allow selected communications into and out of the sandbox using custom application programming interfaces. A kernel driver can be used to encrypt data in transit between components and to destinations outside of the collaborator machine. The stacked file can be a three-dimensional building design, move character, medical part, 3D CAD design, a part for an aircraft, or the like.

Some embodiments provide for a cloud-based file delivery. When the file is opened on the collaborator device (e.g., a 3D printer or a computer) an instance of program (e.g., CAD) can be encapsulated within a sandbox to control access. Traditional sandboxes are designed to keep signals in. In contrast, embodiments of the present technology allow for controlled communications to come in and out of the sandbox (e.g., using kernel driver communications with API of a key management system to unencrypted files). As such, in some embodiments, the sandbox can talk to operating system utilities in a controlled manner. An agent on the collaborator device can provide a runtime environment to open file. If the agent is not present, the user may be asked to install the agent and drivers while allowing only access to the encrypted portion of the stacked file.

Various embodiments of the present technology provide for a wide range of technical effects, advantages, and/or improvements to computing systems and components. For example, various embodiments include one or more of the following technical effects, advantages, and/or improvements: 1) reducing the number of user interactions for accessing encrypted data; 2) use of a new file type (e.g., stacked files) having unencrypted portions that can be read by any target application and encrypted portions that can only be accessed with the right technical configuration of the computing device (e.g., specific software, drivers, application programming interfaces, etc.); 4) use of a cloud-based file sharing platform for sharing sensitive files; 5) creates improvements to the way computing devices operate; 6) uses unconventional and non-routine operations as part of the file accessing process to automatically encapsulate application within a sandbox while using an API to allow communications in and out of the sandbox; and/or 7) changes the manner in which a computing system reacts, processes and manages digital assets shared between multiple developers. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to stacked encryption and file sharing techniques, embodiments of the present technology are equally applicable to various other digital rights management of assets on electronic devices.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a cloud-based collaboration service in which some embodiments of the present technology may be utilized. As illustrated in FIG. 1, communications environment 100 may include one or more electronic devices 110A-110B (such as a mobile phone, tablet computer, mobile media device, mobile gaming device, vehicle-based computer, wearable computing device, 3D printers, etc.) can run applications 120A or 120B. Stacked files 130 can be transferred between electronic devices 110A-110B via collaboration service 140. Collaboration service 140 may be a share drive or service capable of storing any form of electronic data that can be opened on a client device. For example, collaboration service 140 may provide shared access to cloud-based or centralized content and centralized storage for workbooks or project files 150. Examples of these files can include, but are not limited to computer aided drawing files, AutoCAD files, Maya files, Blender files, 3DS Max files, Modo files, spreadsheets, e-mails, etc.

In some embodiments, the collaboration service 140 can also be embedded in electronic devices 110A and 110B and may be communicatively coupled using a network connection (e.g., Wi-Fi, Ethernet, Bluetooth, 3G, 4G, 5G, LTE etc.) or operate as a cloud-based service as illustrated in FIG. 1. In addition, electronic devices 110A-110B can include network communication components that enable the devices to communicate with remote servers or other portable electronic devices by transmitting and receiving wireless signals using licensed, semi-licensed or unlicensed spectrum over a communications network. In some cases, the communications network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

As illustrated in FIG. 1, a user of client A can use input/output (I/O) interface 111 (e.g., keyboard, mouse, voice control unit, touch screen, etc.) to create a digital asset. The request is processed by the operating system layer 112 to launch an application in application layer 113. A new filed is created and stored on local hardware resources 114 (e.g., memory, hard drive, etc.). These resources can request an encryption key from key manager 115. Key manager may reside locally on client device 110A or within cloud-based collaboration service 140. The key returned from key manager 115 can be used to encrypt the digital asset and create a stacked file 130. Client B 110B can received stacked file 130, open the asset, read the unencrypted layer, encapsulate an instance of the application in a sandbox, request key from key manager 115, decrypted the asset, open the file in the sandbox, access the asset data and render a user interface.

Stacked file 130 can be optionally stored in cloud-based collaboration service 140 and an interface can be rendered for sharing the file. Stacked file 130 can include multiple parts including an unencrypted calling card along with an encrypted portion with sensitive data. For example, the file created by client device 110A can be a stereolithography file (i.e., an STL 3D file). The application layer can create the stacked file by adding the asset owner's name and contact information along with any other desired information (e.g., project number, project name, etc.). The unencrypted portion of stacked file 130 can display as a 3D business card and may be used in the stacked encryption process.

The files can be stored in one or more projects 150 (e.g., are containers for the files). Using a file sharing interface, rights (e.g., read only, print only, write access, view a limited number of times, access within a time restricted window, etc.) can be assigned to one or more parties. While FIG. 1 shows stacked file 130 being created at the client collaboration device 110A, in some embodiments, the encryption and file stacking can be performed within the cloud-based collaboration service. For example, when a file owner adds a file or set of files to project 150 in cloud-based collaboration service platform 140, the encryption and stacking processes can be initiated. In accordance with various embodiments, any file type can be added to project 150 in cloud-based collaboration service platform 140.

In accordance with some embodiments, the encryption process may first generate a SHA256 Hash of each file to be encrypted. A GUID can be assigned to each file and then an encryption key can be retrieved (e.g., per file) from a key management system which resides in the cloud. Two versions of each key can be sent to the local machine. One is in plaintext and one is encrypted. Each file can be encrypted using the plaintext key and an AES-256 Rijndael cipher. The plaintext key can be destroyed immediately after use. After the file is encrypted, an unencrypted file (e.g., STL 3D file) can be prepended to the encrypted file and a comment line is inserted in between the encrypted and unencrypted file. This functionally makes the stacked file appear and operate as the unencrypted file (e.g., STL file) but the actual encrypted file resides within. After this process completes, the stacked encrypted files, encrypted keys, GUID's, SHA256 hashes and machine specific identifiers are stored in multiple databases which reside in the cloud.

Once files are stacked encrypted, rights can be assigned by the file owner to other users of the platform. In some embodiments, there are four types of rights that can be assigned. First, a read-only right can launch the model into a sandboxed version of locally installed 3D software but any saves or exports are discarded. Second, a read-only (time limited) right will launch the model into a sandboxed version of locally installed 3D software but any saves or exports are discarded. However, the file will self-destruct after the allotted time has passed (e.g., one day, one week, one month, etc.). Third, an edit right can launch the model into a sandboxed version of 3D software and save or export any edits. If a continued edit flag is set by the job owner, then continued access to edits will be permitted. If the flag is not set, then permission will need to be requested from the owner to continue editing. Edits can be saved back to cloud-based collaboration service 140 and can be accessed with the same permissions assigned to the original file for the user. Finally, a full control permission will purely be for transferring assets and keeping an audit trail.

Some embodiments may track the file, access, edits, and the like while other embodiments will simply create an audit record that someone took receipt of a collection of assets and usage will not be tracked afterward. Rights assignments can be stored in a database in the cloud and associated by Project GUID. Along with the rights assignment, a contract can be associated with the project and stored in a database in the cloud.

In order to access to files by users with rights assigned, the users will need to login to cloud-based collaboration service 140. Users whom are granted rights to a project can be notified in a variety of methods depending on if they already have an account or not. For example, users who do not have an account may receive an email indicating that a project has been shared with them to work on. These users will then be directed to a link to download and install the needed software. After downloading and installing, the users can be prompted to set up their user login info.

Upon completing the registration process and logging in, the user will be presented with their project dashboard. Any project which is shared with the logged in user will be displayed on the main dashboard screen. The first time a user attempts to access a newly shared project, they may be presented with a legal agreement ("Contract") which clearly defines the scope of what they can do with the assets. After reading the agreement and accepting, the users can be brought to the project detail screen. This is where assets or collections of assets can be accessed and launched for work to begin.

Projects can also be blank, in some embodiments, and rights can be assigned to any new assets created for the project. This can be accomplished, for example, by having the user launch the job and choose an application to work in. Once this step is complete, the user can be presented with a new blank session in their preferred locally installed design tool (e.g., AutoCAD, Maya, Blender, 3DS Max, Modo etc.).

Figure 2:
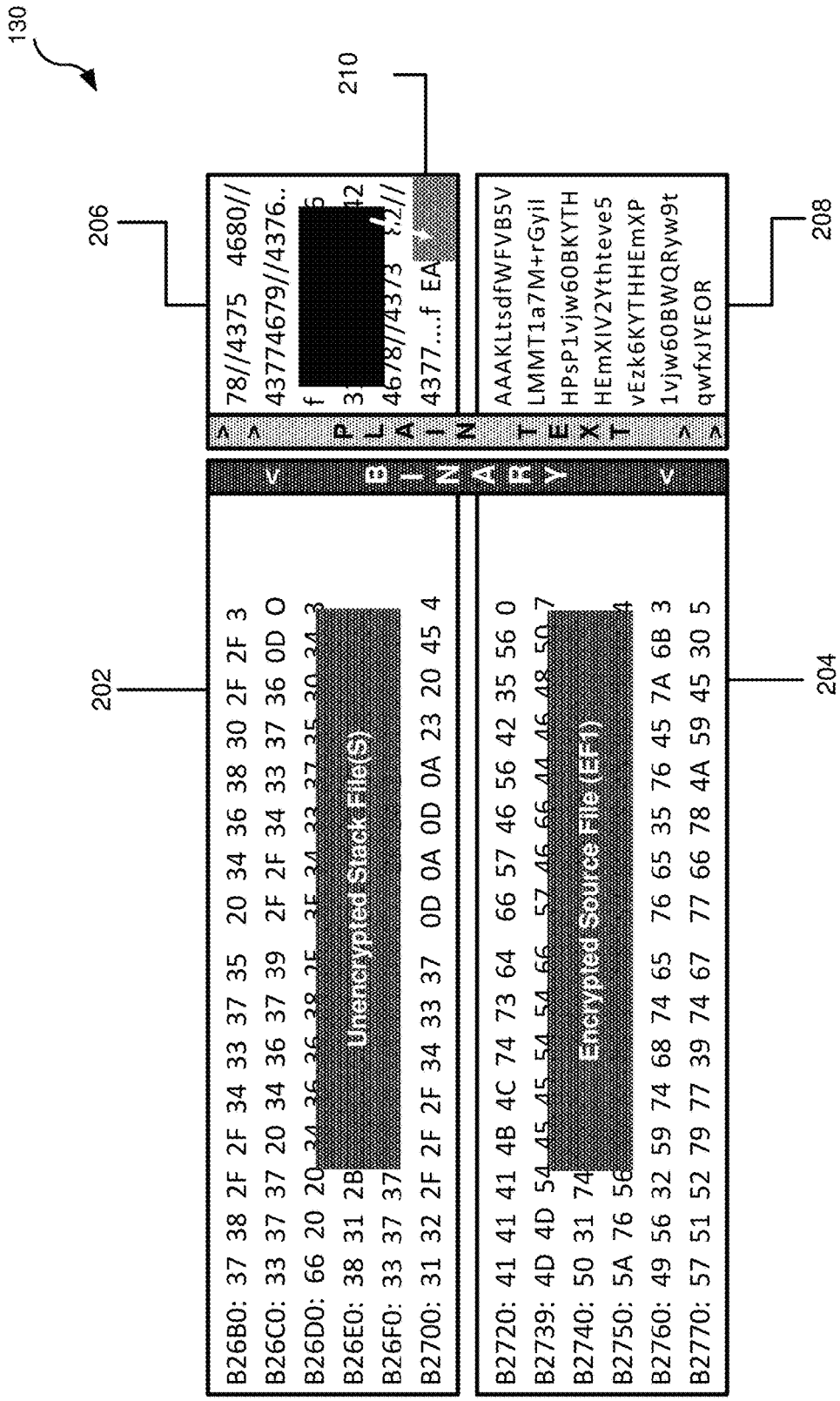
FIG. 2 depicts a section of unencrypted code stacked on top of an encrypted source file that may be used in accordance with one or more embodiments of the present technology.

FIG. 2 depicts a section of unencrypted code stacked on top of an encrypted source file that may be used in accordance with one or more embodiments of the present technology. As illustrated in FIG. 2, unencrypted file portion 202/206 stacked on top of an encrypted file portion 204/208. The top-left side of FIG. 2 illustrates the binary view of the file portions and the right side is plain text of the file portions. A marker 210 indicating the start of a comment section can be seen in the plain text of the code shown in FIG. 2. As is observable from FIG. 2, the marker 210 terminates the unencrypted file portion 202/206 and begins the encrypted file portion 204/208.

Additionally, the stacked encryption may enable the combined file to be opened in its native application where as normal encryption (a fully encrypted file) would not, in most circumstance, indicate the format of the file. Embodiments of the method/file system may comprise code configured to prevent text editors from viewing the raw text content of the combined file (e.g. by crashing text editors attempting to read the combined file). This may provide an additional level of security for the contents of the file.

In various embodiments, the unencrypted portion of the file, when read, may be configured to prompt the person attempting to run the combined file to pursue proper avenues to legally obtain access to the encrypted portion of file (e.g. advertise the creator and allow for proper channels of access to be obtained). Having the unencrypted file configured in such a manner may encourage parties obtaining the combined file in an unauthorized manner to legally obtain access to the file, thereby providing monetization opportunities to the file's owner. Such a mechanism may also be used to provide any parties attempting to access the encrypted file notice of the proprietary nature and/or copyrighted status of the file.

Figure 3:
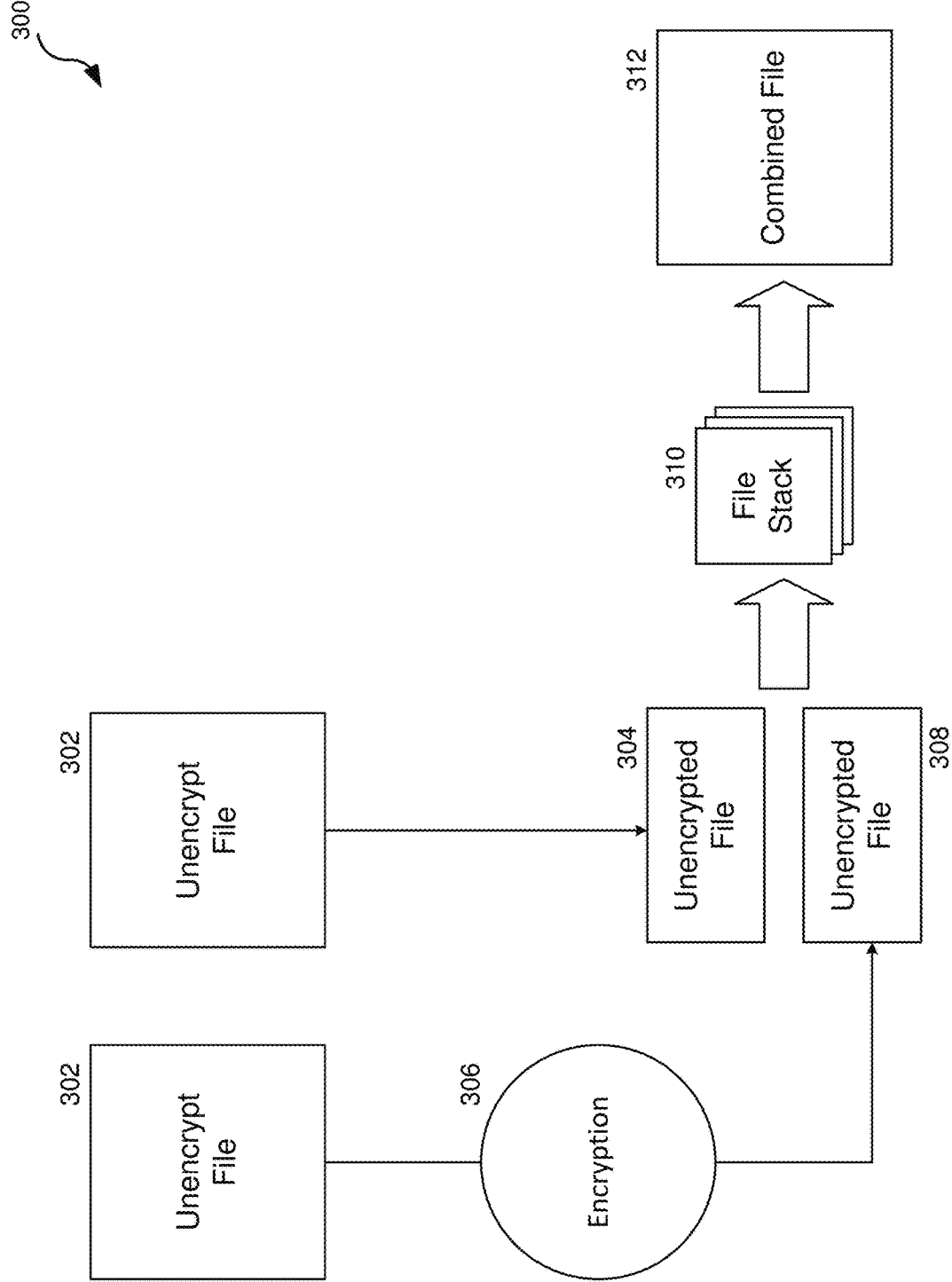
FIG. 3 is a flowchart illustrating an example of a set of operations for combining two separate files, one encrypted and one unencrypted, into a single stacked file with an unencrypted file portion and an encrypted file portion in accordance with some embodiments of the present technology.

FIG. 3 is a flowchart illustrating an example of a set of operations for combining two separate files, one encrypted and one unencrypted, into a single stacked file with an unencrypted file portion and an encrypted file portion in accordance with some embodiments of the present technology. FIG. 3 depicts and exemplary method 200 for creating a combined file 312 from a plurality of files, at least one of which is encrypted. A first unencrypted file 302 may undergo encryption 306 resulting in encrypted file 308. Encrypted file 308 may be combined with unencrypted file 304 to form a files stack 310 the unencrypted file 304 and the encrypted file 308 in the file stack 310 may then be merged together to form combined file 312. In embodiments, combined file 312 may comprise the encrypted portion of encrypted file 308 set apart from the unencrypted portion of unencrypted file 304 through use of markers, such as commenting markers.

By placing the unencrypted portion of unencrypted file 304 on top of encrypted file 308 combined file 312 may appear to be in a normal format for those attempting to read combined file 312, while maintaining the encrypted file 308 portion as unreadable.

Figure 4:
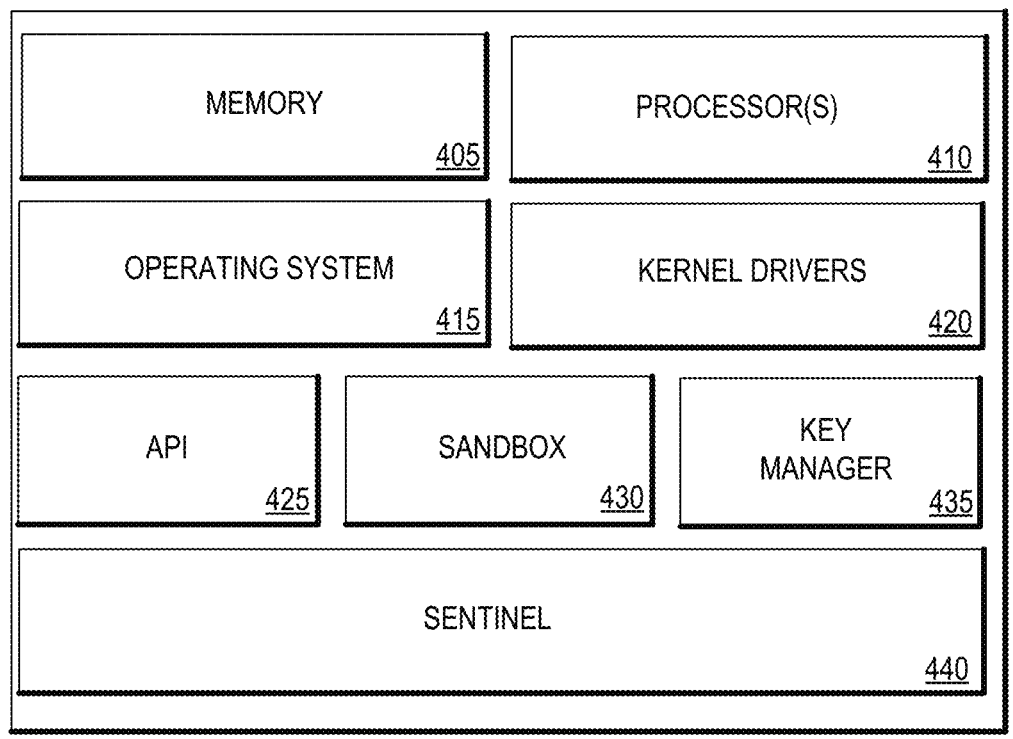
FIG. 4 illustrates various components of a collaborations device according to one or more embodiments of the present technology.

FIG. 4 illustrates various components of a collaboration device 110 according to one or more embodiments of the present technology. According to the embodiments shown in FIG. 4, collaboration device 110 can include memory 405, one or more processors 410, operating system 415, kernel drivers 420, application programming interface 425, sandbox 430, key manager 435, and sentinel 440. Each of these modules or components can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 405 can be any device, mechanism, or populated data structure used for storing information. In accordance with some embodiments of the present technology, memory 405 can encompass any type of, but is not limited to, volatile memory, nonvolatile memory and dynamic memory. For example, memory 405 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 405.

Memory 405 may be used to store instructions for running one or more applications or modules on processor(s) 410. For example, memory 405 could be used in one or more embodiments to house all or some of the instructions needed to execute the functionality of operating system 415, kernel drivers 420, application programming interface 425, sandbox 430, key manager 435, and/or sentinel 440. Operating system 415 provides a software package that is capable of managing the hardware resources of collaboration device 110. Operating system 415 can also provide common services for software applications running on processor(s) 410.

Kernel drivers 420 can be part of an install package needed before a stacked file can be accessed. The kernel drivers can include an encryption driver to un-encrypt incoming files and selectively encrypt outgoing files. The files chosen to encrypt depend upon which local application has been chosen to launch the protected file. This determination can be made from profiles which are stored in databases (e.g., in cloud-based collaboration service 140). This data can be transmitted directly to the driver and may be also encrypted to facilitate a secure hand over. The data to un-encrypt can be passed from a sentinel driver as well as the keys. The keys to encrypt data may also be received from the sentinel driver or key manager 435.

Application programming interface (API) 425 can provide a set of data structures, object classes, subroutine definitions, protocols, tools, variables, and the like for building application software. API 425 can allow for communication between various software components. For example, API 425 can allow selected information and commands to flow in and out of sandbox 430. Sandbox 430 can isolate a portion of memory 405 (e.g., volatile and non-volatile memory) to provide a secure location for launching applications to open stacked files. The stacked files can be launched into a chosen local application which is contained within a sandbox. The sandbox allows the collaboration service to control the instance of the software launched in the following manner: 1) prevent cut and paste from the instance of the application to another which does not reside in the sandbox; 2) allocates disk space and memory so as to corral the applications output to a predictable location which can be hidden from the user and prevent users from accessing these portions of the disk space and memory; and 3) these locations can be watched by sentinel driver 440 for the entire duration in which a protected asset is active and in use.

Sentinel 440 controls the inflow and outflow of data from the platform. When the main application (1) launches a file, this driver handles retrieval and watches all processes occurring while the file is vulnerable. This driver interfaces with remote databases and key management system API gets the file data, and the keys needed to encrypt or decrypt. Sentinel 440 can pass this information to the encryption driver to facilitate operations.

Figure 5:
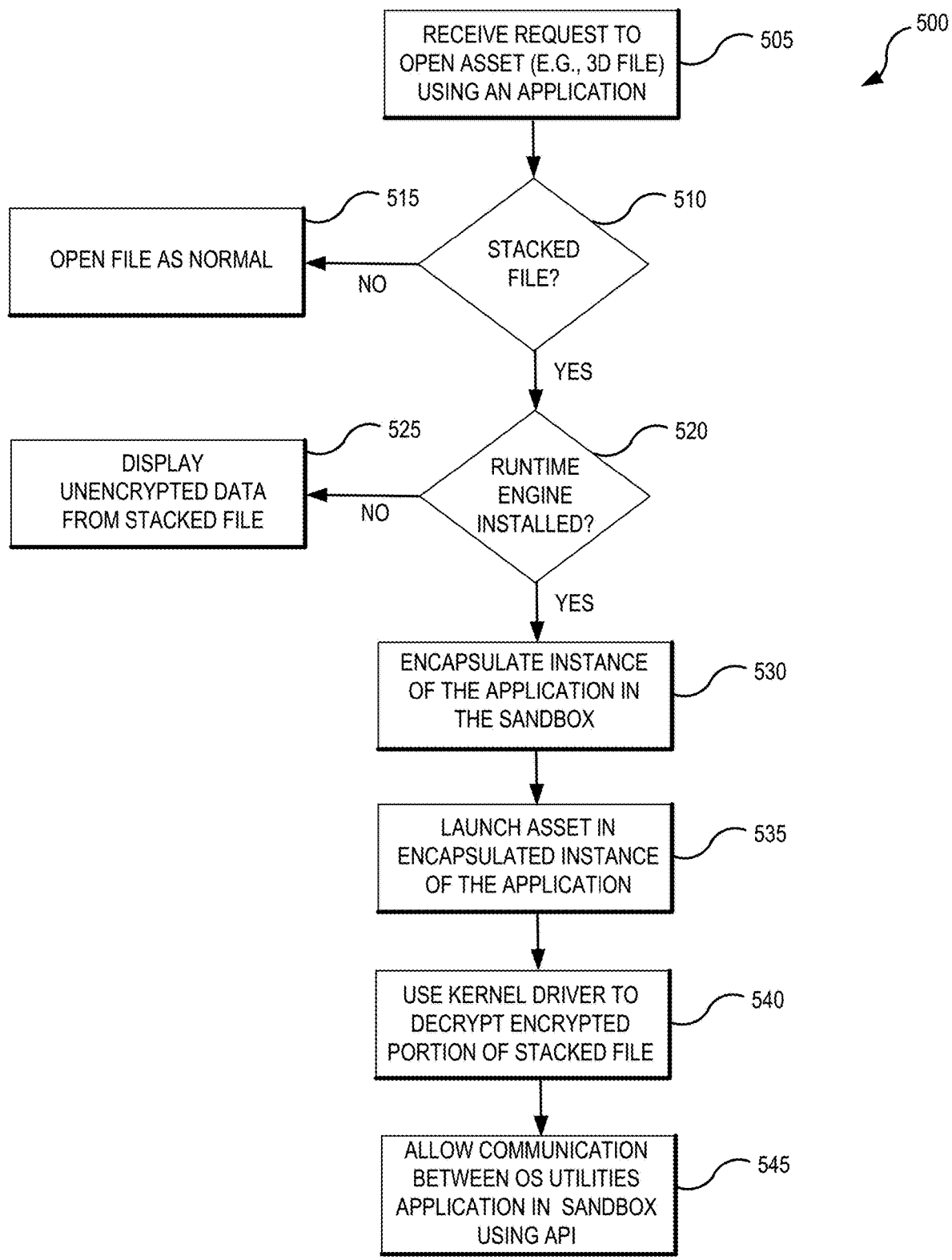
FIG. 5 is a flowchart illustrating an example of a set of operations for opening a file according to various embodiments of the present technology.

FIG. 5 is a flowchart illustrating an example of a set of operations 500 for opening a file according to various embodiments of the present technology. As illustrated in FIG. 5, a request to open an asset using an application (e.g., AutoCAD) is received during requesting operation 505. Stacked file determination operation 510 determines whether the file is a stacked file or a traditional file. When stacked file determination operation 510 determines the file is not a stacked file, then stacked file determination operation 510 branches to normal open operation 515 where the file is opened as normal within the selected application. When stacked file determination operation 510 determines the file is not a stacked file, then stacked file determination operation 510 branches to runtime installed operation 520, where a determination is made as to whether a needed runtime environment is installed on the machine.

When runtime installed operation 520 determines that the proper runtime environment is not installed, then runtime installed operation 520 branches to limited display operation 525 where only the unencrypted data from the stacked file is opened. This can include an invitation to sign up for an account and download the runtime environment. When runtime installed operation 520 determines the proper runtime environment is installed, the runtime installed operation 520 branches to encapsulation operation 530 and launching operation 535 launches the stacked file within the application encapsulated within a sandbox (e.g., an isolated and controlled portion of memory and hard disk space). Decryption operation 540 uses a kernel driver to decrypt the encrypted portion of the stacked file. Communication operation 545 allows selected communications to flow between the OS utilizes and the application the sandbox using APIs. These communications may be based on rights associated with the stacked file.

Figure 6:
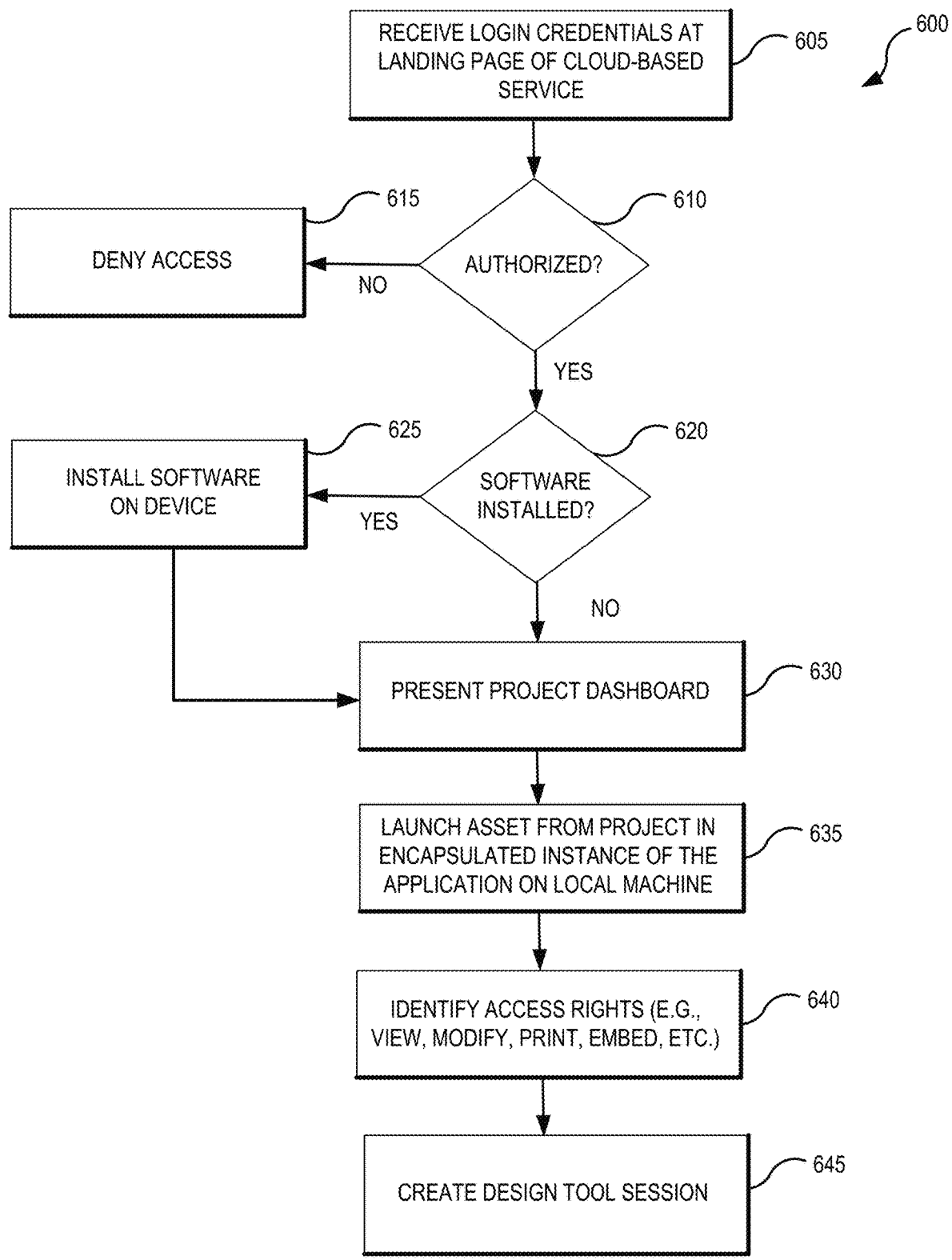
FIG. 6 is a flowchart illustrating an example of a set of operations for creating a design tool session in accordance with some embodiments of the present technology.

FIG. 6 is a flowchart illustrating an example of a set of operations 600 for creating a design tool session in accordance with some embodiments of the present technology. As illustrated in FIG. 6, login credentials are received at a landing page of a cloud-based service (e.g., 140 in FIG. 1) during access operation 605. Authorization determination operation 610 validates the credentials and determines whether the user is allowed to access the cloud-based service. When authorization determination operation 610 determines the user credentials are not valid, authorization determination operation 610 branches to denial operation 615 where access is denied.

When authorization determination operation 610 determines the user credentials are valid, authorization determination operation 610 branches to installation determination operation 620 where a determination is made as to whether the need runtime environment (e.g., kernel drivers, APIs, sentinel, etc.) have been installed on the machine. When installation determination operation 620 determines the appropriate runtime environment has not been installed, then installation determination operation 620 branches to installation operation 625 where the user is invited to install the software and drivers.

Figure 7A:
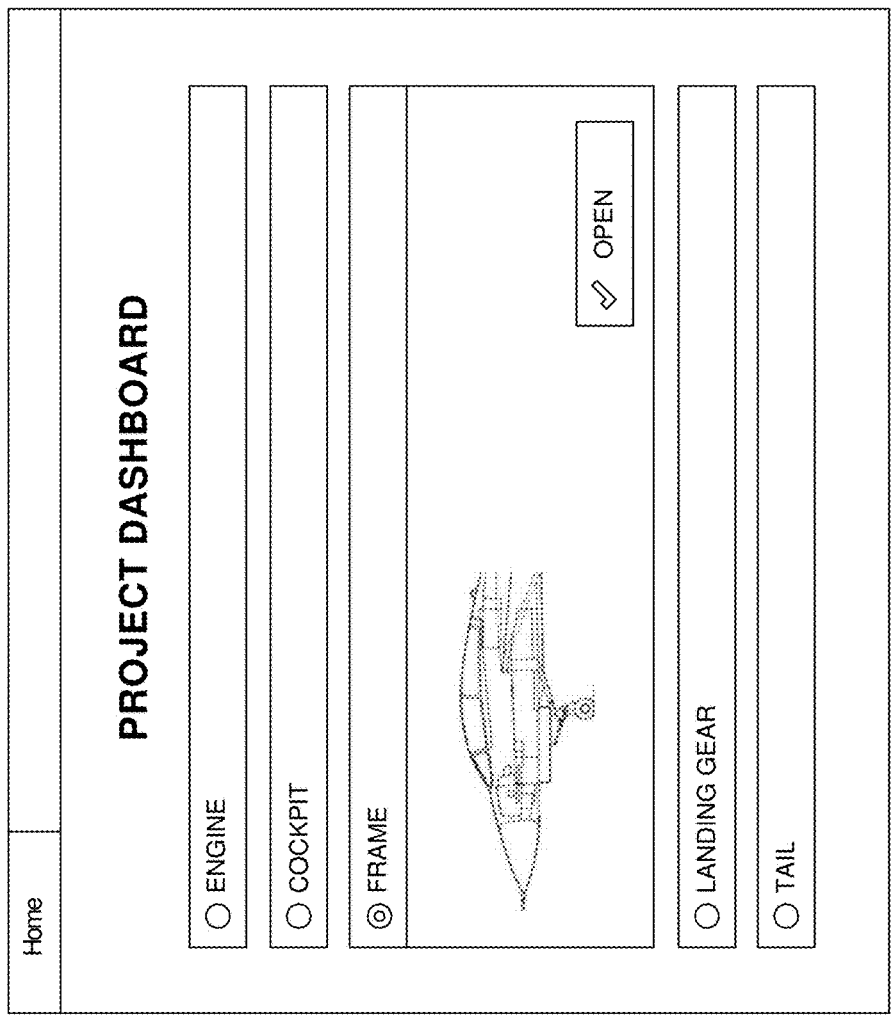
Figure 7B:
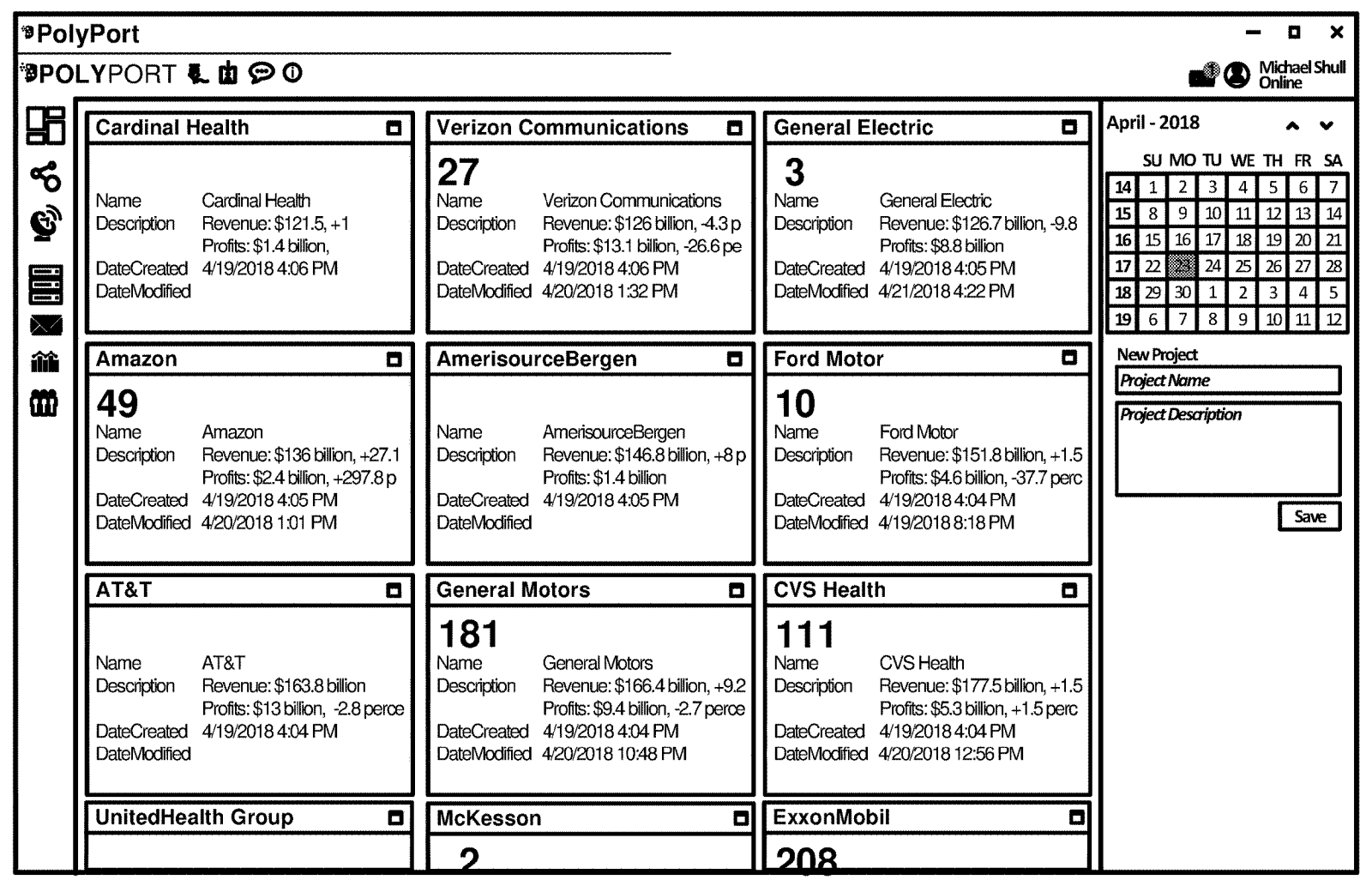

Once installed, presentation operation 630 presents a dashboard of projects to which the user has access. FIGS. 7A-7B illustrate examples of a project dashboard that can be used in accordance with some embodiments of the present technology. From the project dashboard, the user can select an asset to open. In response to this selection, launching operation 635 launches the asset from the project in an encapsulated instance of the application within a sandbox on the user's local machine. Identification operation 640 can determine the access rights for that user. This can limit operations, viewing periods or provide other restrictions on use of the asset during a session created by design session operation 645.

Exemplary Computer System Overview

Aspects and implementations of the stacked encryption system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 8:
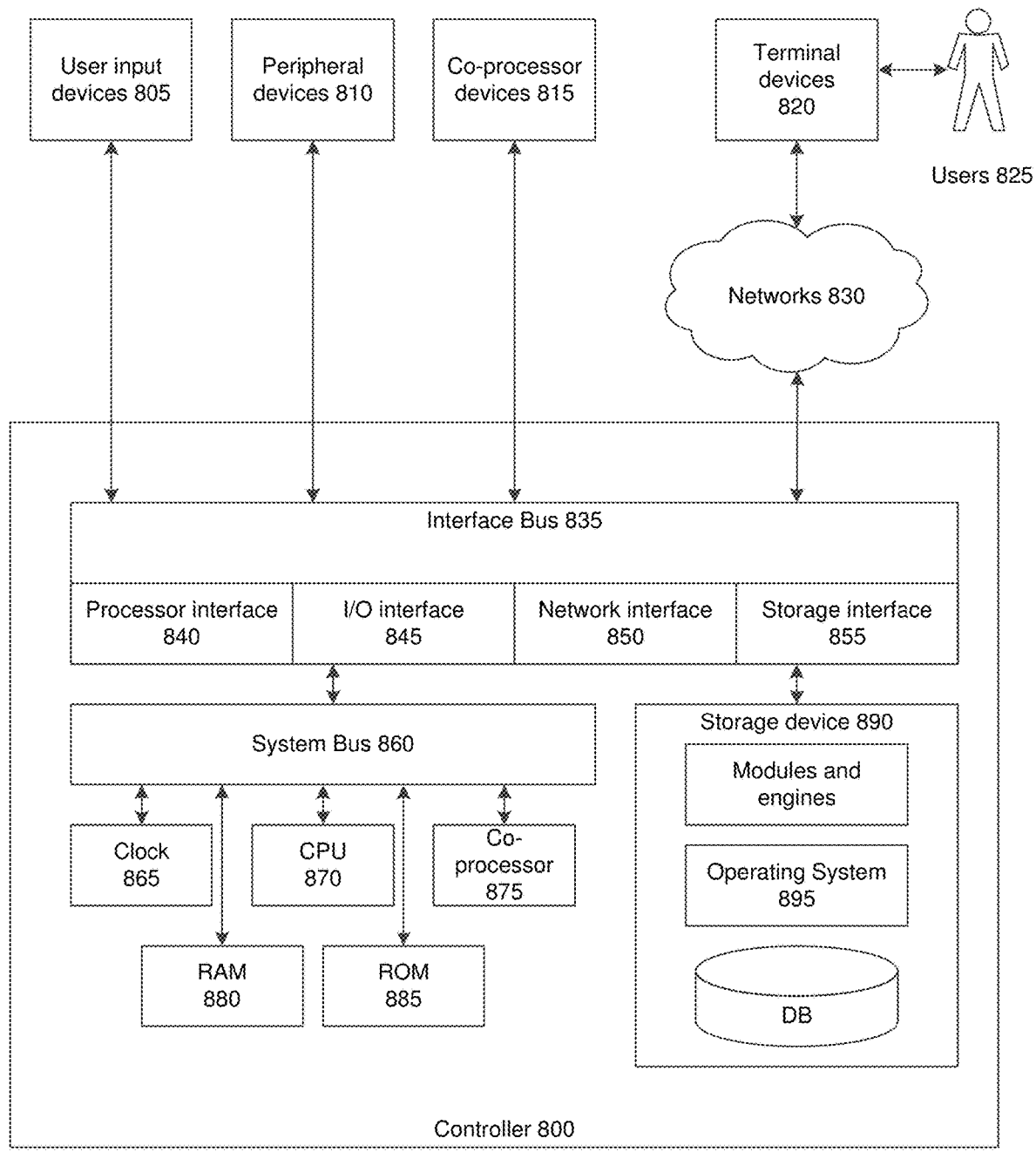
FIG. 8 illustrates an example of a computer systemization that can be used for implementing various embodiments of the present technology.

FIG. 8 is a block diagram illustrating an example machine representing the computer systemization of the stacked encryption system. The system controller 800 may be in communication with entities including one or more users 825 client/terminal devices 820 (e.g., electronic devices 110A-110B), user input devices 805, peripheral devices 810, an optional co-processor device(s) (e.g., cryptographic processor devices) 815, and networks 830. Users may engage with the controller 800 via terminal devices 820 over networks 830.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 800 may include clock 865, CPU 870, memory such as read only memory (ROM) 885 and random access memory (RAM) 880 and co-processor 875 among others. These controller components may be connected to a system bus 860, and through the system bus 860 to an interface bus 835. Further, user input devices 805, peripheral devices 810, co-processor devices 815, and the like, may be connected through the interface bus 835 to the system bus 860. The interface bus 835 may be connected to a number of interface adapters such as processor interface 880, input output interfaces (I/O) 885, network interfaces 850, storage interfaces 855, and the like.

Processor interface 840 may facilitate communication between co-processor devices 815 and co-processor 875. In one implementation, processor interface 840 may expedite encryption and decryption of requests or data. Input output interfaces (I/O) 845 facilitate communication between user input devices 805, peripheral devices 810, co-processor devices 815, and/or the like and components of the controller 800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 850 may be in communication with the network 830. Through the network 830, the controller 800 may be accessible to remote terminal devices 820. Network interfaces 850 may use various wired and wireless connection protocols such as, direct connect, Ethernet, wireless connection such as IEEE 802.11a-x, and the like.

Examples of network 830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 855 may be in communication with a number of storage devices such as, storage devices 890, removable disc devices, and the like. The storage interfaces 855 may use various connection protocols such as Serial Advanced Technology Attachment (SATA), IEEE 1394, Ethernet, Universal Serial Bus (USB), and the like.

User input devices 805 and peripheral devices 810 may be connected to I/O interface 845 and potentially other interfaces, buses and/or components. User input devices 805 may include card readers, finger print readers, joysticks, keyboards, microphones, mouse, remote controls, retina readers, touch screens, sensors, and/or the like. Peripheral devices 810 may include antenna, audio devices (e.g., microphone, speakers, etc.), cameras, external processors, communication devices, radio frequency identifiers (RFIDs), scanners, printers, storage devices, transceivers, and/or the like. Co-processor devices 815 may be connected to the controller 800 through interface bus 835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 800 may employ various forms of memory including on-chip CPU memory (e.g., registers), RAM 880, ROM 885, and storage devices 890. Storage devices 890 may employ any number of tangible, non-transitory storage devices or systems such as fixed or removable magnetic disk drive, an optical drive, solid state memory devices and other processor-readable storage media. Computer-executable instructions stored in the memory may include the service 140 having one or more program modules such as routines, programs, objects, components, data structures, and so on that perform particular tasks or implement particular abstract data types. For example, the memory may contain operating system (OS) component 895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 800 may be distributed electronically over the Internet or over other networks (including wireless networks).

Those skilled in the relevant art(s) will recognize that portions of the system may reside on a server computer, while corresponding portions reside on a client computer. Data structures and transmission of data particular to aspects of the controller 800 are also encompassed within the scope of the disclosure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A collaboration service comprising:
   one or more processors;
   a project database to store projects that each include a digital asset; and
   a communication component to connect the collaboration service to a first collaborator device and a second collaborator device,
      wherein the first collaborator device to create the digital asset to be stored on the project database as a stacked file that includes an encrypted portion and an unencrypted portion so that the second collaborator device can only access the unencrypted portion when a runtime environment is properly installed; and
      wherein the unencrypted portion of the stacked file is readable by an application running on the second collaborator device when the runtime environment is not properly installed and presents within the application a set of instructions to download the runtime environment.

2. The collaboration service of claim 1, wherein the runtime environment on the second collaborator device includes a sentinel to identify a stacked file type is being opened and launch an encapsulated instance of an application within a sandbox.

3. The collaboration service of claim 2, wherein the runtime environment on the second collaborator device further includes an application programming interface to allow communications between the application running within the sandbox and operating system utilities.

4. The collaboration service of claim 3, wherein the first collaborator device associates rights with the stacked file and wherein the sentinel enforces any restrictions associated with the rights within the sandbox.

5. The collaboration service of claim 2, wherein the runtime environment on the second collaborator device further includes kernel drivers that retrieve a key from a key management system to decrypt the encrypted portion of the stacked file.

6. The collaboration service of claim 1, wherein the encrypted portion is a first file created on the first collaborator device and the unencrypted portion is a second file created by the collaboration service that includes identifying information about a creator of the first file or of an associated project.

7. The collaboration service of claim 6, further comprising an encryption system to encrypt the first file once the first file is associated with one of the projects.

8. A method comprising:
stacking an unencrypted file with an encrypted file; and
combining the unencrypted file with the encrypted file to form a single combined file;
wherein the single combined file includes a marker separating the unencrypted file from the encrypted file and indicates to a computer program reading the single combined file to read the unencrypted file, but not read the encrypted file.

9. The method of claim 8, further comprising receiving, at a cloud-based collaboration service, the encrypted file, automatically generating the unencrypted file, and generated the single combined file in response to the encrypted file being added to a project within the cloud-based collaboration service.

10. The method of claim 8, wherein the unencrypted file displays as a three-dimensional business card that includes instructions on subscribing to a cloud-based collaboration service.

11. The method of claim 8, further comprising generating a hash of a file to be encrypted, assigning an identifier to the file, retrieving an encryption key to generate the encrypted file.

12. The method of claim 8, wherein the encrypted file is a three-dimensional design.

13. The method of claim 12, wherein the three-dimensional design was created using AutoCAD, Maya, Blender, 3DS Max, or Modo.

14. A method for reading a stacked file having an encrypted file portion and an unencrypted file portion, the method comprising:
creating a sandbox within portion of volatile memory and nonvolatile memory of a machine;
encapsulating an instance of an application within the sandbox;
decrypting, using a kernel driver installed on the machine, the encrypted file portion; and
allowing communications into and out of the sandbox with the use of an application programming interface.

15. The method of claim 14, further comprising determining whether a runtime environment is installed on the machine and wherein the stacked file includes markers that indicate to the application reading the stacked file to read the unencrypted file portion and not read the encrypted file portion of the stacked file unless the runtime environment is installed.

16. The method of claim 15, wherein the unencrypted file displays as a three-dimensional business card that includes instructions on subscribing to a cloud-based collaboration service when the runtime environment is not installed.

17. The method of claim 14, wherein the unencrypted file portion and the encrypted file portion are separated from one another through use of markers.

18. The method of claim 14, wherein the encrypted file portion is a file containing a three-dimensional design created using created using AutoCAD, Maya, Blender, 3DS Max, or Modo.

19. A collaboration service comprising:
one or more processors;
a project database to store projects that each include a digital asset; and
a communication component to connect the collaboration service to a first collaborator device and a second collaborator device,
wherein the first collaborator device to create the digital asset to be stored on the project database as a stacked file that includes an encrypted portion and an unencrypted portion so that the second collaborator device can only access the unencrypted portion when a runtime environment is properly installed; and
wherein the runtime environment on the second collaborator device includes a sentinel to identify a stacked file type is being opened and launch an encapsulated instance of an application within a sandbox.

20. The collaboration service of claim 19, wherein the runtime environment on the second collaborator device further includes an application programming interface to allow communications between the application running within the sandbox and operating system utilities.

21. The collaboration service of claim 20, wherein the first collaborator device associates rights with the stacked file and wherein the sentinel enforces any restrictions associated with the rights within the sandbox.

22. The collaboration service of claim 19, wherein the runtime environment on the second collaborator device further includes kernel drivers that retrieve a key from a key management system to decrypt the encrypted portion of the stacked file.

23. The collaboration service of claim 19, wherein the encrypted portion is a first file created on the first collaborator device and the unencrypted portion is a second file created by the collaboration service that includes identifying information about a creator of the first file or of an associated project.

24. The collaboration service of claim 23, further comprising an encryption system to encrypt the first file once the first file is associated with one of the projects.

25. A method comprising:
stacking an unencrypted file with an encrypted file; and
combining the unencrypted file with the encrypted file to form a single combined file;
wherein the unencrypted file displays as a three-dimensional business card that includes instructions on subscribing to a cloud-based collaboration service.

26. The method of claim 25, further comprising receiving, at a cloud-based collaboration service, the encrypted file, automatically generating the unencrypted file, and generated the single combined file in response to the encrypted file being added to a project within the cloud-based collaboration service.

27. The method of claim 25, further comprising generating a hash of a file to be encrypted, assigning an identifier to the file, retrieving an encryption key to generate the encrypted file.

28. The method of claim 25, wherein the encrypted file is a three-dimensional design.

29. The method of claim 28, wherein the three-dimensional design was created using AutoCAD, Maya, Blender, 3DS Max, or Modo.

30. A method comprising:
stacking an unencrypted file with an encrypted file;
combining the unencrypted file with the encrypted file to form a single combined file;
generating a hash of a file to be encrypted;
assigning an identifier to the file; and
retrieving an encryption key to generate the encrypted file.

31. The method of claim 30, further comprising receiving, at a cloud-based collaboration service, the encrypted file, automatically generating the unencrypted file, and generated the single combined file in response to the encrypted file being added to a project within the cloud-based collaboration service.

32. The method of claim 30, wherein the encrypted file is a three-dimensional design.

33. The method of claim 32, wherein the three-dimensional design was created using AutoCAD, Maya, Blender, 3DS Max, or Modo.

34. A method comprising:
  stacking an unencrypted file with an encrypted file; and
  combining the unencrypted file with the encrypted file to form a single combined file;
    wherein the encrypted file is a three-dimensional design.

35. The method of claim 34, further comprising receiving, at a cloud-based collaboration service, the encrypted file, automatically generating the unencrypted file, and generated the single combined file in response to the encrypted file being added to a project within the cloud-based collaboration service.

36. The method of claim 34, wherein the three-dimensional design was created using AutoCAD, Maya, Blender, 3DS Max, or Modo.

* * * * *